US012078589B2

(12) United States Patent
Taniguchi et al.

(10) Patent No.: US 12,078,589 B2
(45) Date of Patent: Sep. 3, 2024

(54) OPTICAL MEASURING DEVICE

(71) Applicant: Nippon Telegraph and Telephone Corporation, Tokyo (JP)

(72) Inventors: Tomohiro Taniguchi, Musashino (JP); Kazutaka Hara, Musashino (JP); Atsuko Kawakita, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 269 days.

(21) Appl. No.: 17/638,122

(22) PCT Filed: Aug. 27, 2019

(86) PCT No.: PCT/JP2019/033578
§ 371 (c)(1),
(2) Date: Feb. 24, 2022

(87) PCT Pub. No.: WO2021/038730
PCT Pub. Date: Mar. 4, 2021

(65) Prior Publication Data
US 2022/0291118 A1 Sep. 15, 2022

(51) Int. Cl.
*G01N 21/21* (2006.01)
*G01N 21/17* (2006.01)

(52) U.S. Cl.
CPC ..... *G01N 21/21* (2013.01); *G01N 2021/1744* (2013.01); *G01N 2021/1793* (2013.01)

(58) Field of Classification Search
CPC ........ A23L 33/115; A23L 33/15; A23L 33/16; A23L 19/00; A23L 27/105; A23L 33/105;
(Continued)

(56) References Cited

U.S. PATENT DOCUMENTS

| 4,566,788 A | 1/1986 | Buczek |
| 2013/0027715 A1 | 1/2013 | Imaki et al. |

(Continued)

FOREIGN PATENT DOCUMENTS

| JP | H1090177 | 4/1998 |
| JP | 2011252871 | 12/2011 |

(Continued)

OTHER PUBLICATIONS

DynaSense Inc., "Measurement with head mount NIRS close to you Pocket NIRS HM Measures biometric information with a tissue oxygen monitor using near infrared spectroscopy (NIRS)," retrieved on Jul. 11, 2019, retrieved from URL <https://www.dynasense.co.jp/product_hm.html>, 13 pages (with English Translation).

(Continued)

*Primary Examiner* — Sunghee Y Gray
(74) *Attorney, Agent, or Firm* — Fish & Richardson P.C.

(57) ABSTRACT

An objective of the present invention is to provide an optical measurement device capable of performing remote optical measurement. An optical measurement device may include a light source that generates irradiation light with a beam shape, a beam control unit configured to control an irradiation direction of the irradiation light L1, a condensing unit configured to condense returned light generated by irradiating a part of a measurement target with the irradiation light, and a detection unit configured to detect information regarding the measurement target included in the returned light condensed by the condensing unit. The beam control unit can control the irradiation direction of the irradiation light for measurement to any direction, and thus the condensing unit can efficiently receive the faint returned light from the measurement target.

7 Claims, 11 Drawing Sheets

(58) Field of Classification Search
CPC ... A23L 33/135; A61K 2300/00; A61K 31/05; A61K 31/201; A61K 36/28; A61K 36/324; A61K 36/328; A61K 36/484; A61K 36/752; A61K 45/06; A61K 47/02; A61K 47/14; A61K 47/44; A61K 8/922; A61K 9/0014; A61K 9/143; A61K 9/4858; A61K 35/57; A61K 47/12; A61K 47/542; A61K 47/59; A61K 47/593; A61K 47/60; A61K 47/6951; A61K 8/361; A61P 1/00; A61Q 17/005; A61Q 17/02; A61Q 19/02; A61Q 19/08; A61Q 19/10; A61Q 5/12; A61Q 7/00; A61Q 19/00; G01N 2021/1793; G01N 21/21; G01N 2021/1744; G01N 2021/845; G01N 21/474; G01N 2201/0691; B82Y 5/00
USPC .......................................................... 356/364
See application file for complete search history.

(56) References Cited

U.S. PATENT DOCUMENTS

| | | | | |
|---|---|---|---|---|
| 2014/0303463 | A1* | 10/2014 | Robinson | G01J 3/02 600/316 |
| 2017/0160201 | A1 | 6/2017 | Nishizawa et al. | |
| 2017/0266758 | A1* | 9/2017 | Fukui | B23K 26/042 |
| 2018/0317821 | A1* | 11/2018 | Arko | A61B 5/14532 |

FOREIGN PATENT DOCUMENTS

| | | |
|---|---|---|
| JP | 2014182076 | 9/2014 |
| JP | 2015225049 | 12/2015 |
| JP | 2015230229 | 12/2015 |
| JP | 2017003531 | 1/2017 |
| JP | 2018016410 | 2/2018 |
| WO | WO 2011138895 | 11/2011 |
| WO | WO 2018155291 | 8/2018 |

OTHER PUBLICATIONS

NeU Corporation, "[Sales and provision of research equipment] Brain measurement hardware (NIRS) & system, HOT-2000 Portable brain activity measurement device," retreived on Jul. 11, 2019, retrieved from URL <https://neu-brains.co.jp/service/equipments/hot-2000/>, 17 pages (with English Translation).

Shimoyama et al., "Non-Destructive Identification of Blue Colorants in Ukiyo-e Prints by Visible-Near Infrared Reflection Spectrum Obtained with a Portable Spectrophotometer Using Fiber Optics," Analytical Chemistry, 2006, 55(2):121-126.

* cited by examiner

OPTICAL MEASURING DEVICE

CROSS-REFERENCE TO RELATED APPLICATIONS

This application is a National Stage application under 35 U.S.C. § 371 of International Application No. PCT/JP2019/033578, having an International Filing Date of Aug. 27, 2019, the disclosure of which is considered part of the disclosure of this application, and is incorporated in its entirety into this application.

TECHNICAL FIELD

The present disclosure relates to an optical measurement device measuring a physical property of a measurement object remotely using light.

BACKGROUND ART

Various optical measurement technologies for focusing on optical absorption properties of living bodies or substances are known. A main technology is infrared spectroscopy (for example, see NPL 1). This technology is a technology for understanding a property of a measurement target by emitting infrared light to the target and measuring its absorption spectrum, and is applied to various kinds of objects such as food, buildings, and human bodies.

As another applied example, cerebral blood flow measurement (near-infrared spectroscopy (NIRS)) using infrared light, which is one method of measuring the state of brain activity, is known (for example, NPLs 2 or 3). This technology is a technology using a property of infrared light of 800 nm or the like to be easily transmitted through human tissues and absorbed by hemoglobin in blood. A cerebral blood flow is estimated based on an amount of light returned to a detection unit by emitting infrared light from above the scalp. To achieve measurement in various situations, small-sized devices have been developed.

CITATION LIST

Non Patent Literature

NPL 1: Shimoyama, et al. "Non-Destructive Identification of Blue Colorants in Ukiyo-e Prints by Visible-Near Infrared Reflection Spectrum Obtained with a Portable Spectrophotometer Using Fiber Optics," Analytical Chemistry, 55(2), pp. 121 to 126, 2006.
NPL 2: NeU Corporation (https://neu-brains.co.jp/service/equipments/hot-2000/, retrieved on 11 Aug. 2019)
NPL 3: DynaSense Inc. (https://www.dynasense.co.jp/product_hm.html, retrieved on 11 Aug. 2019)

SUMMARY OF THE INVENTION

Technical Problem

In all the above-described NPLs, devices are configured to approach or come into close contact with measurement targets to emit and detect infrared light. Devices are also configured using optical fibers. However, in this case, it is necessary to cause tips of the optical fibers to approach measurement targets.

On the other hand, when various usage scenarios such as line inspection in factories are assumed, the problem is to be able to measure the measurement targets remotely without causing device bodies and optical fibers to approach the measurement targets or causing the device bodies or the optical fibers to come into close contact with the measurement targets. The cerebral blood flow measurement disclosed in NPL 3 is a dedicated device brought into close contact with a head. However, if a remote measurement method is achieved, the dedicated device is likely to be provided as a module of a general-purpose device such as smart glasses, which can expand usage scenarios.

Accordingly, to solve the foregoing problem, an objective of the present invention is to provide an optical measurement device capable of performing remote optical measurement.

Means for Solving the Problem

To solve the foregoing objective, an optical measurement device according to aspects of the present invention includes an irradiation unit and a detection unit that are located away from a measurement target to achieve remote optical measurement.

Specifically, according to an aspect of the present invention, an optical measurement device includes
  a light source configured to generate irradiation light with a beam shape,
  a beam control unit configured to control an irradiation direction of the irradiation light,
  a condensing unit configured to condense returned light generated by irradiating a part of a measurement target with the irradiation light, and
  a detection unit configured to detect information regarding the measurement target included in the returned light condensed by the condensing unit.

In the optical measurement device, the beam control unit can control the irradiation direction of the irradiation light for measurement to any direction, and thus the condensing unit can efficiently receive the faint returned light from the measurement target. Accordingly, the present invention can provide the optical measurement device capable of performing remote optical measurement.

In the optical measurement device according to the aspect of the present invention, the beam control unit changes the irradiation direction of the irradiation light with time to scan a surface of the measurement target. The optical measurement device can scan irradiation light, and thus can measure each part of a measurement target.

The optical measurement device according to the aspect of the present invention further includes a camera configured to acquire an image of the measurement target, and an image recognition unit configured to recognize, from the image, an irradiation position where the measurement target is irradiated with the irradiation light. In the optical measurement device according to the aspect of the present invention, the beam control unit notifies the image recognition unit of a target position on the measurement target to be irradiated with the irradiation light and corrects, when there is a deviation between the target position and the irradiation position, a direction of the irradiation light to reduce the deviation, and the image recognition unit detects the deviation from the image and notifies the beam control unit of the deviation that is detected. The optical measurement device can irradiate a desired measurement part with light by performing beam control through image recognition.

In the optical measurement device according to the aspect of the present invention, the light source includes a modulation unit that modulates the irradiation light at a specific frequency, and the detection unit includes a filter that extracts a component of the specific frequency from a received signal obtained by converting the returned light into an electrical signal. The optical measurement device can suppress an influence of noise light and perform detection with high sensitivity.

In the optical measurement device according to the aspect of the present invention, the condensing unit is a lens that collects the returned light into a light receiving unit. The optical measurement device can collect scattering returned light on a light receiving element using a lens, and thus can improve detection sensitivity.

In the optical measurement device according to the aspect of the present invention, the condensing unit includes a light receiving element array with a plurality of light receiving elements being arrayed and an integrator that integrates an electrical signal received by the light receiving element array. The optical measurement device can detect, in a plane manner, the scattering faint returned light, and thus can improve detection sensitivity.

The aspects of the present invention can be combined as much as possible.

Effects of the Invention

The present invention can provide the optical measurement device capable of performing remote optical measurement.

DESCRIPTION OF EMBODIMENTS

Embodiments of the present invention will be described with reference to the appended drawings. The following embodiments are examples of the present invention and the present invention is not limited to the following embodiments. Constituent elements with the same reference numerals in the present specification and the drawings are assumed to be the same.

First Embodiment

Figure 1:
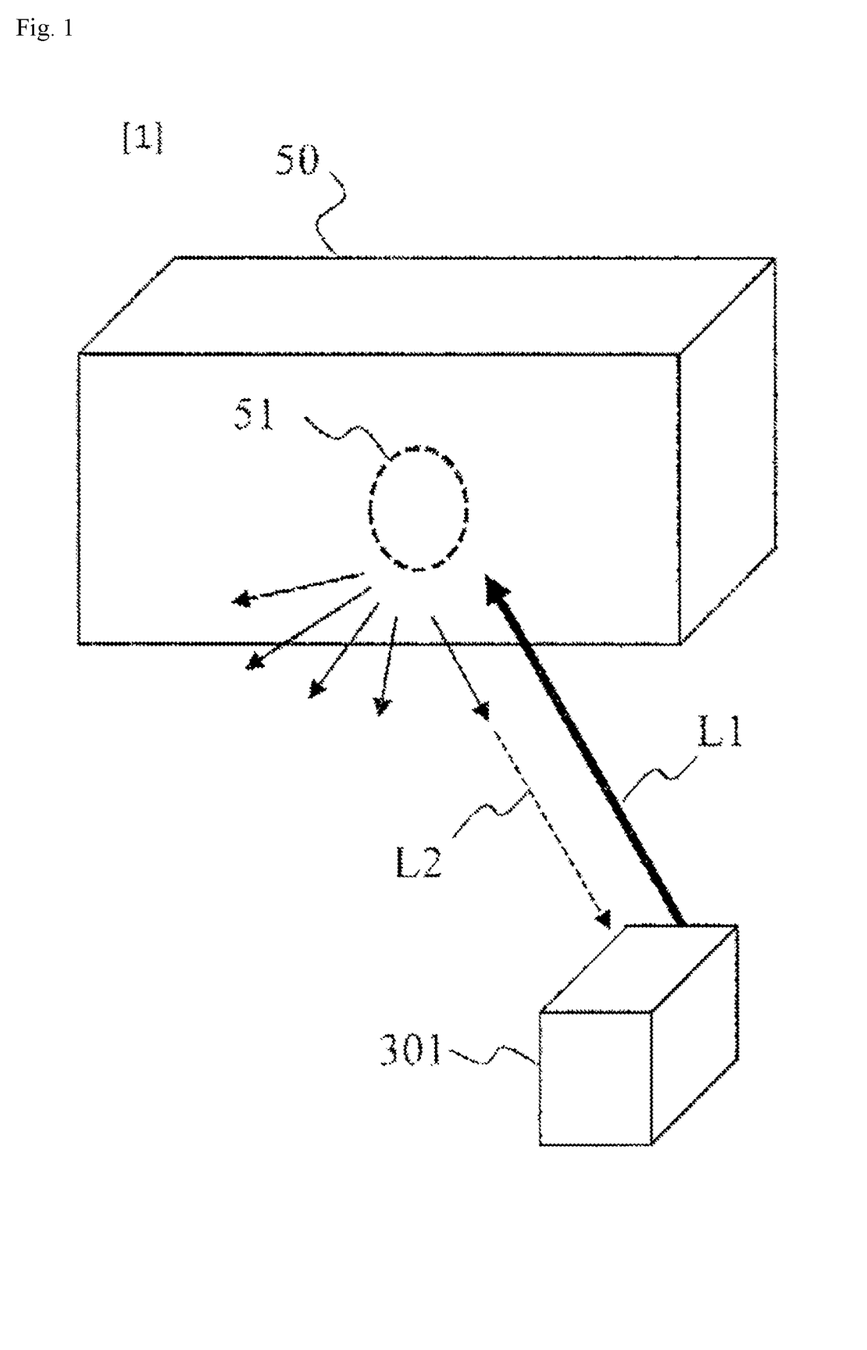
FIG. 1 is a diagram illustrating an optical measurement device according to the present invention.

FIG. 1 is a diagram illustrating an optical measurement device 301 according to the present embodiment. As in FIG. 1, an optical measurement device 301 is away from a measurement target 50. The optical measurement device 301 irradiates a measurement part 51 of the measurement target 50 with irradiation light L1, focusing on the measurement part 51. The irradiation light L1 is scattered on the surface or inside the measurement part 51, and includes information regarding components of the measurement part 51 at that time. The measurement target 50 receives part of the scattered light as returned light L2.

Figure 2:
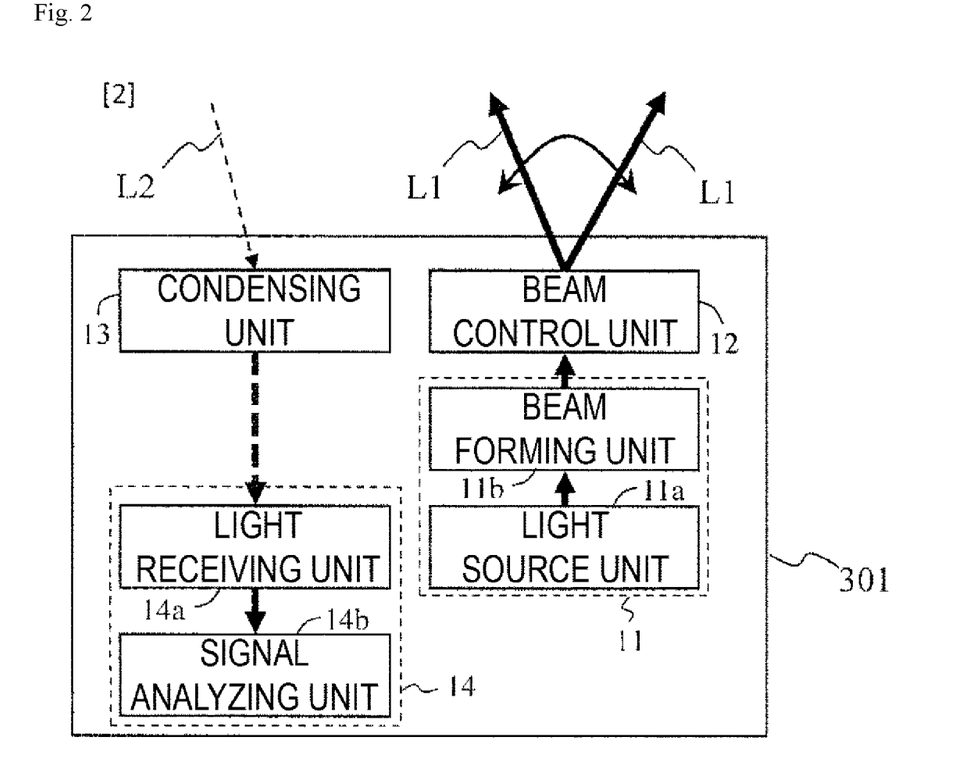
FIG. 2 is a diagram illustrating the optical measurement device according to the present invention.

FIG. 2 is a diagram illustrating a configuration of the optical measurement device 301 according to the present embodiment.

The optical measurement device 301 includes
 a light source 11 configured to generate irradiation light L1 with a beam shape,
 a beam control unit 12 configured to control an irradiation direction of the irradiation light L1,
 a condensing unit 13 configured to condense returned light L2 generated by irradiating a part of a measurement target 50 with the irradiation light L1, and
 a detection unit 14 configured to detect information regarding the measurement target 50 included in the returned light L2 condensed by the condensing unit 13.

The light source 11 is a laser diode (LD) that outputs visible light or infrared light. When there is polarization dependence in an optical absorption property of the measurement target 50, it is preferable to use a light source capable of controlling a polarization state of the irradiation light L1. By controlling the polarization state of the irradiation light L1, for example, the optical measurement device 301 can measure a difference in absorbance between clockwise circularly polarized light and counterclockwise circularly polarized light.

The light source 11 may include a light source unit 11a and a beam forming unit 11b as in FIG. 2. When the light source unit 11a is a light emitting diode (LED), the irradiation light L1 is formed as a beam by the beam forming unit 11b. The beam forming unit 11b is, for example, a lens that condenses optical power spatially and forms a narrow beam.

The beam control unit 12 controls an output direction of the irradiation light L1 such that the measurement part 51 of the measurement target 50 is irradiated with the formed beam-shaped irradiation light L1. The beam control unit 12 is, for example, a micro electro mechanical systems (MEMS) mirror. For example, an operator can adjust the beam control unit 12 such that the desired measurement part 51 is irradiated with the irradiation light L1 while checking an irradiation point of the irradiation light L1 on the measurement target 50. A marker may be attached to the measurement part 51 of the measurement target 50. The beam control unit 12 may cause the irradiation light L1 to scan and control the irradiation light L1 to irradiate a marker position detected from the returned light L2 by the detection unit 14.

The condensing unit 13 optically or electrically condenses the returned light L2. The embodiment is a mode in which the condensing unit 13 optically condenses the returned light L2. The condensing unit 13 is, for example, a lens.

According to the embodiment, the detection unit 14 includes a light receiving unit 14a and a signal analyzing unit 14b. The light receiving unit 14a receives the returned light L2 condensed by the condensing unit 13. The light receiving unit 14a is, for example, a photodiode (PD). The signal analyzing unit 14b estimates a physical quantity (a physical property, a cerebral blood flow, or the like) of the measurement part 51 of the measurement target 50 based on an output value of the light receiving unit 14a.

In this way, the optical measurement device 301 can measure the physical quantity of the measurement part 51 even when the optical measurement device 301 is away from the measurement target 50.

Second Embodiment

Figure 3:
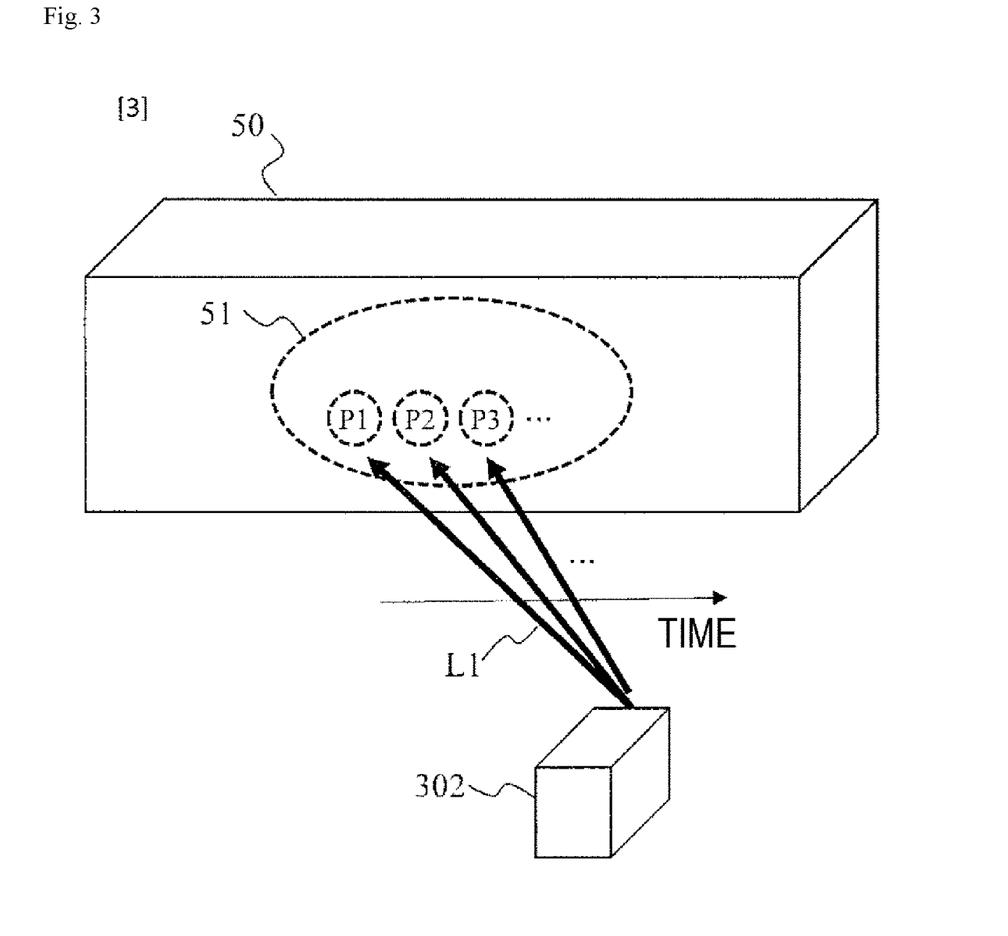
FIG. 3 is a diagram illustrating an optical measurement device according to the present invention.

FIG. 3 is a diagram illustrating an optical measurement device 302 according to the present embodiment. A difference between the optical measurement device 302 and the optical measurement device 301 in FIG. 1 is that the optical measurement device 302 can measure a physical quantity while varying a direction of the irradiation light L1.

Figure 4:
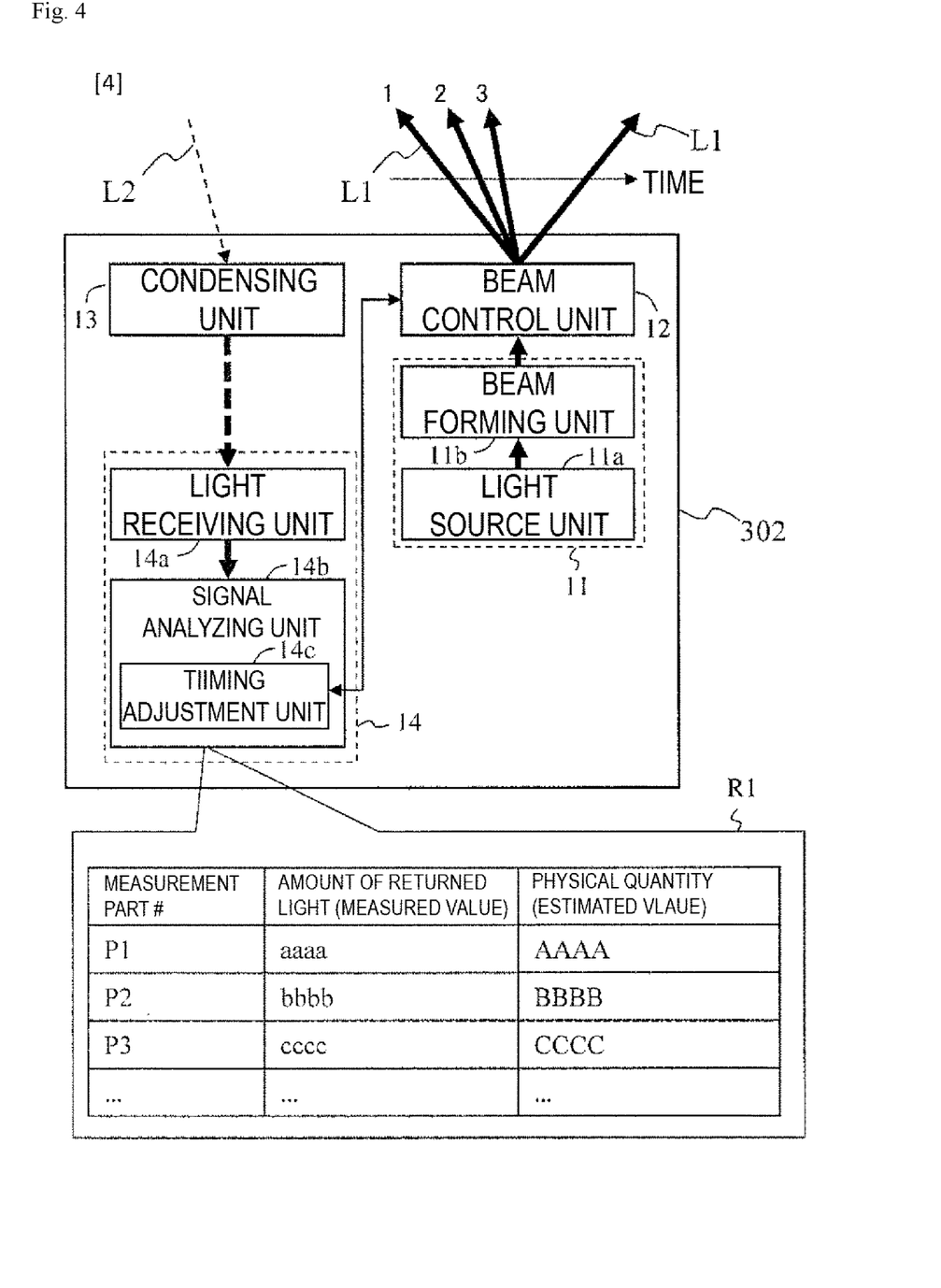
FIG. 4 is a diagram illustrating the optical measurement device according to the present invention.

FIG. 4 is a diagram illustrating a configuration of the optical measurement device 302. The optical measurement device 302 changes an irradiation direction of the irradiation light L1 with time so that the beam control unit 12 scans the surface of the measurement target 50, compared to the optical measurement device 301 in FIG. 1. The optical measurement device 302 includes a timing adjustment unit 14c to match a timing between the direction of the irradiation light L1 and measurement of the returned light L2. The optical measurement device 302 shifts the direction of the irradiation light L1 with time to change irradiation positions P1, P2, P3, and the like of the irradiation light L1 with which the measurement part 51 is irradiated. Then, the detection unit 14 sequentially receives the returned light L2 from the irradiation positions P1, P2, P3, and the like of the irradiation light L1 and estimates a physical quantity (a physical property, a cerebral blood flow, or the like) of each irradiation position as in Table R1.

In this way, the optical measurement device 302 can measure a physical quantity of the measurement part 51 even when the optical measurement device 302 is away from the measurement target 50. Further, since the physical quantity of each irradiation position in the measurement part 51 can be acquired, a distribution of the physical quantities in the measurement part 51 can be measured.

Third Embodiment

Figure 5:
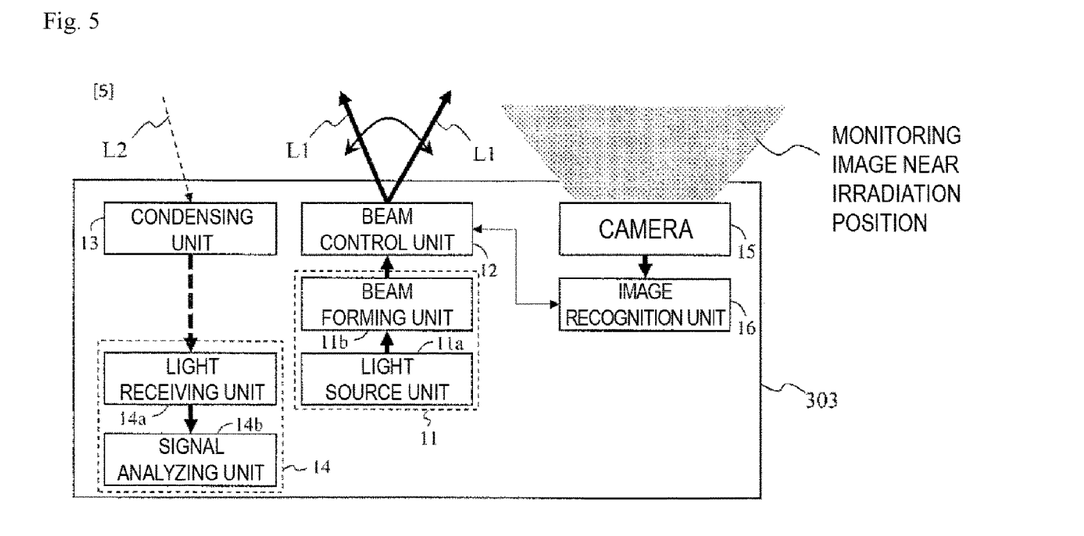
FIG. 5 is a diagram illustrating an optical measurement device according to the present invention.

FIG. 5 is a diagram illustrating an optical measurement device 303 according to the present embodiment. A difference between the optical measurement device 303 and the optical measurement device 301 in FIG. 1 is that the optical measurement device 303 further includes a camera 15 that acquires an image of the measurement target 50 and an image recognition unit 16 that recognizes an irradiation position at which the measurement target 50 is irradiated with the irradiation light L1 from the image.

The camera 15 acquires an image near an irradiation position of the measurement target 50 irradiated with the irradiation light L1. The camera 15 has sensitivity to visible light or infrared light depending on a wavelength of the irradiation light L1. That is, the camera 15 can notify the image recognition unit 16 of an irradiation position of the irradiation light L1 along with the measurement target 50.

The beam control unit 12 notifies the image recognition unit 16 of a target position on the measurement target 50 to be irradiated with the irradiation light L1. The image recognition unit 16 can understand which part of the measurement target 50 is irradiated with the irradiation light L1 based on information from the camera 15. Then, the image recognition unit 16 can determine whether there is a deviation between the target position and the actual irradiation position. Then, the image recognition unit 16 notifies, when a deviation is detected, the beam control unit 12 of information regarding the deviation. When there is a deviation between the target position and the irradiation position, the beam control unit 12 corrects the direction of the irradiation light L1 using the information such that the deviation becomes small.

In this way, even when the optical measurement device 303 is away from the measurement target 50, the optical measurement device 303 can measure a physical quantity of the measurement part 51 and can correct the deviation between the target position and the actual irradiation position. Therefore, it is possible to measure an accurate physical quantity of the measurement part 51.

Fourth Embodiment

Figure 6:
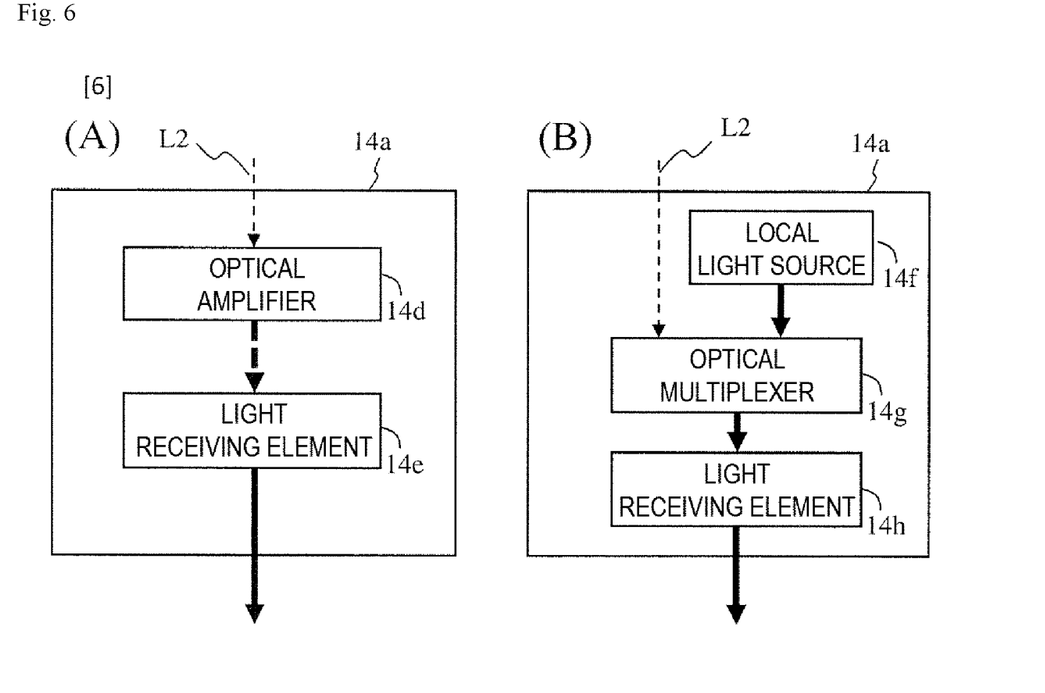
FIG. 6 is a diagram illustrating a light receiving unit of the optical measurement device according to the present invention.

FIG. 6 is a diagram illustrating a specific example of a light receiving unit 14a of an optical measurement device according to the present embodiment. Each optical measurement device according to the first to third embodiments performs measurement in a state in which the optical measurement device is away from the measurement target 50. Therefore, each optical measurement device according to the first to third embodiments has to perform measurement with faint returned light compared to the optical measurement device in NPLs 1 to 3. In the embodiment, a configuration of the light receiving unit 14a capable of detecting the faint returned light will be described.

FIG. 6(A) illustrates a configuration in which the arriving returned light L2 is amplified by an optical amplifier 14d, and then received by a light receiving element 14e. The light receiving element 14e is a photodiode (PD), an avalanche PD, or the like.

FIG. 6(B) illustrates a configuration of optical coherent detection in which the arriving returned light L2 and light from a local light source 14f are multiplexed by an optical multiplexer 14g to interfere with each other, and then received by a light receiving element 14h.

The light receiving unit 14a that has the configuration of FIG. 6(A) or 6(B) can detect faint returned light with high sensitivity.

Fifth Embodiment

Figure 7:
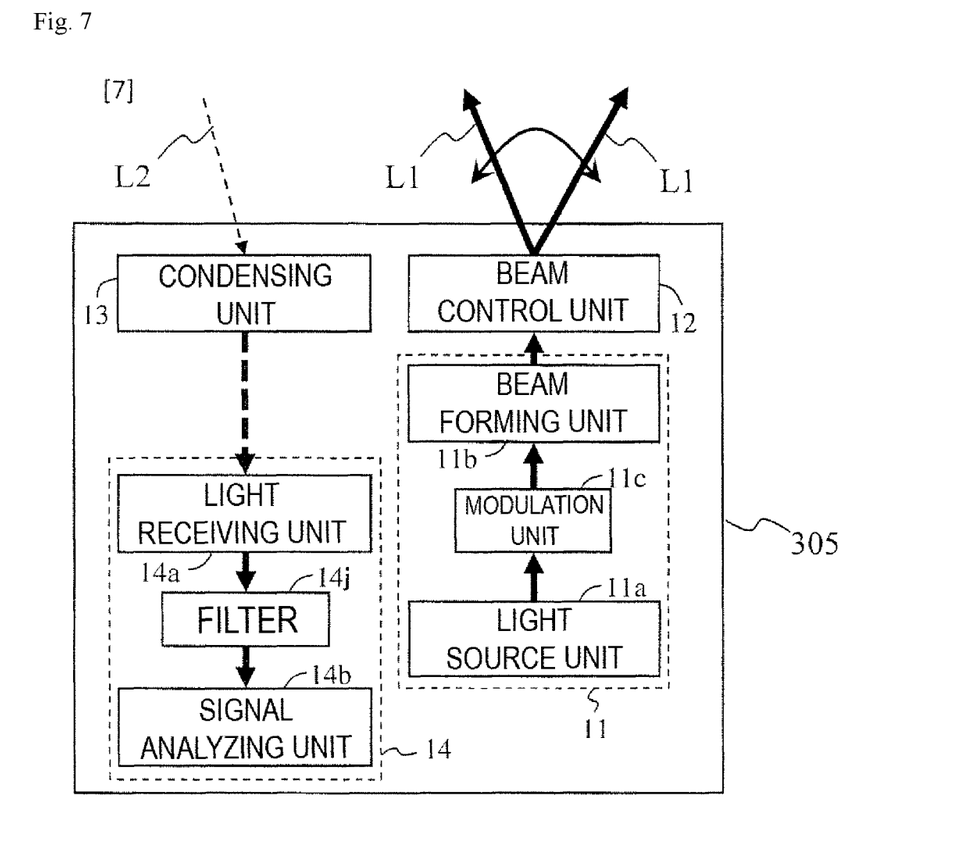
FIG. 7 is a diagram illustrating an optical measurement device according to the present invention.

FIG. 7 is a diagram illustrating an optical measurement device 305 according to the present embodiment. A difference between the optical measurement device 305 and the optical measurement device 301 in FIG. 1 is that the optical measurement device 305 outputs the irradiation light L1 modulated at a predetermined frequency.

The light source 11 includes a modulation unit 11c that modulates the irradiation light L1 at a specific frequency. The modulation unit 11c modulates light output by the light source unit 11a with a low frequency (for example, analog modulation at a sinusoidal wave of 270 Hz). Therefore, the optical measurement device 305 outputs the irradiation light L1 of an optical signal (chopped light) modulated at the low frequency.

The detection unit 14 includes a filter 14j that extracts a component of the specific frequency from a received signal in which the returned light L2 is converted into an electrical signal. After the returned light L2 is converted into an electrical signal by the light receiving unit 14a, the filter 14j extracts a modulation component (for example, a 270 Hz signal) at the low frequency. Since an influence of noise light is output in the vicinity of DC, the filter 14j can separate a noise light component. The filter 14j outputs a current amount or the like of the extracted signal component to the signal analyzing unit 14b.

In this way, even when the optical measurement device 305 is away from the measurement target 50, the optical measurement device 305 can measure a physical quantity of the measurement part 51 and can further suppress the influence of the noise light to measure a physical quantity of the measurement part 51 with high sensitivity.

Sixth Embodiment

Figure 8:
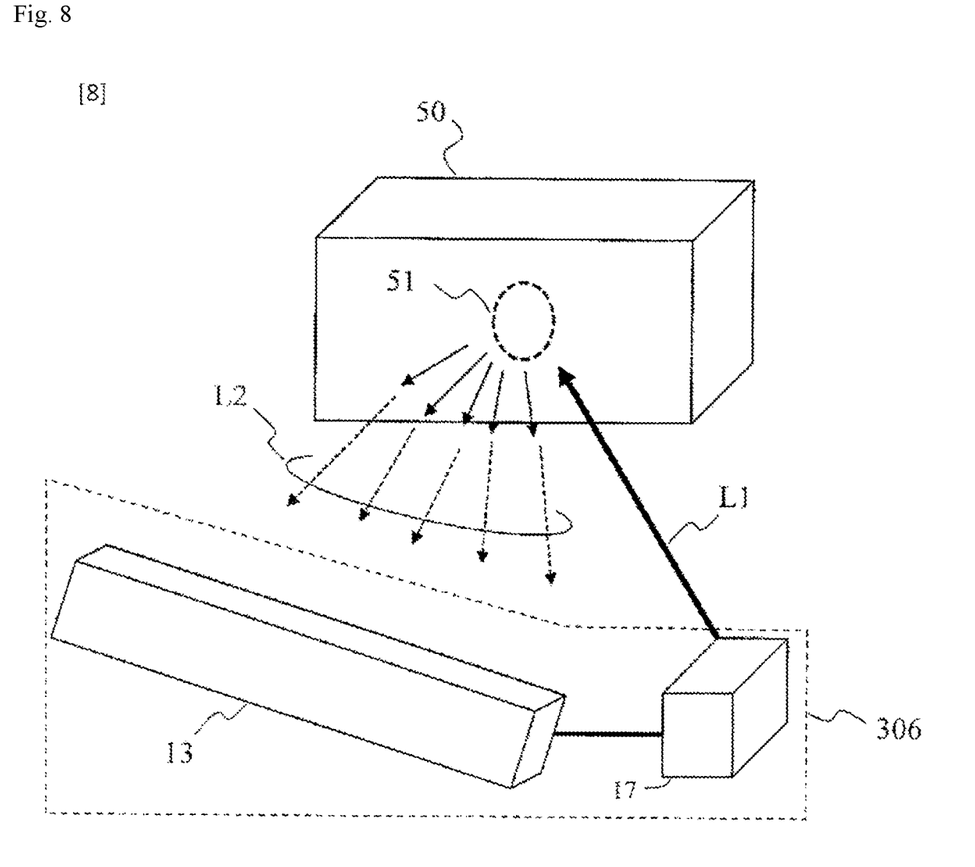
FIG. 8 is a diagram illustrating an optical measurement device according to the present invention.

FIG. 8 is a diagram illustrating an optical measurement device 306 according to the present embodiment. A difference between the optical measurement device 306 and the optical measurement device 301 in FIG. 1 is that a light receiving element array is mounted in a light receiving portion of the optical measurement device 306 to detect, in a plane manner, the returned light L2 scattered in multiple directions.

Figure 9:
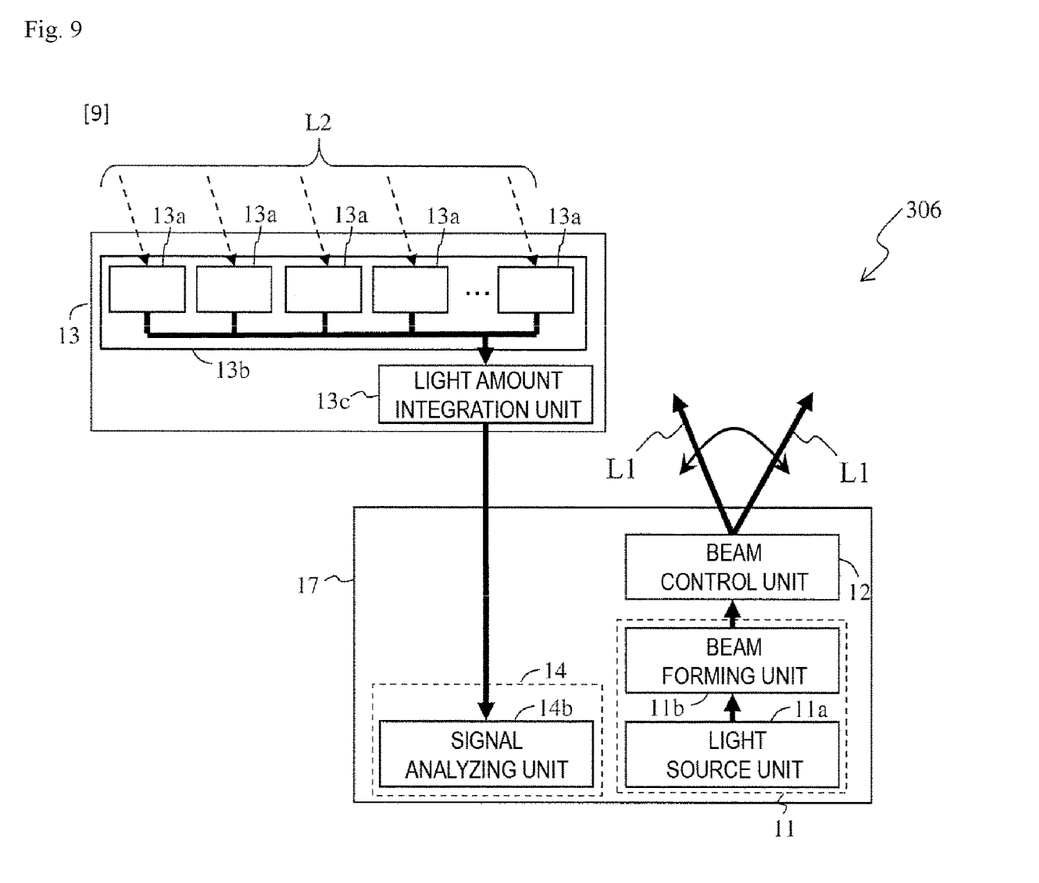
FIG. 9 is a diagram illustrating the optical measurement device according to the present invention.

FIG. 9 is a diagram illustrating a configuration of the optical measurement device 306. In the optical measurement device 306, compared to the optical measurement device 301 in FIG. 1, the condensing unit 13 includes a light receiving element array 13b in which a plurality of light receiving elements 13a are arrayed and an integrator 13c that integrates electrical signals received by the light receiving element array 13b. That is, in the optical measurement device 306, the light source 11, the beam control unit 12, and the signal analyzing unit 14b of the optical measurement device 301 in FIG. 2 are disposed in a measurement module 17 and units corresponding to the condensing unit 13 and the light receiving unit 14a are disposed outside of the measurement module 17. The condensing unit 13 and the measurement module 17 are connected by an electrical wiring.

The optical measurement device 306 receives, as much as possible, the returned light L2 in which the irradiation light L1 is scattered at the measurement part 51 of the measurement target 50 using the light receiving element array 13b. Then, the integrator 13c collects and integrates all the electrical signals (optical current) of the returned light L2 received by each light receiving element 13a of the light receiving element array 13b. Therefore, the integrator 13c can output the electrical signals of the returned light L2, which is faint alone, to the detection unit 14 as a large electrical signal.

In this way, even when the optical measurement device 306 is away from the measurement target 50, the optical measurement device 306 can measure a physical quantity of the measurement part 51 and can further detect, in a plane manner, the faint returned light L2 scattered in multiple directions to receive the returned light L2 with high sensitivity.

Example 1

Figure 10:
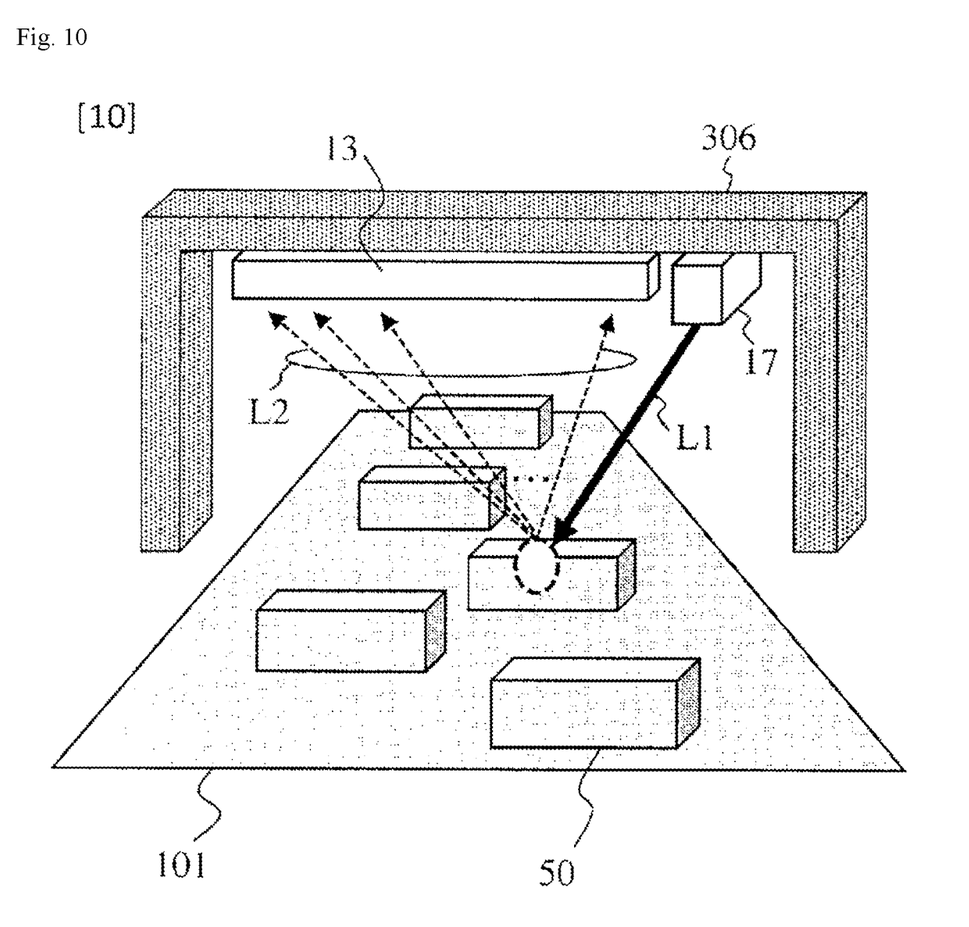
FIG. 10 is a diagram illustrating an example of the optical measurement device according to the present invention.

FIG. 10 is a diagram illustrating an example in which the optical measurement device 306 is applied to an inspection line 101 of a factory. A manufactured product is conveyed as the measurement target 50 to the optical measurement device 306 by a belt conveyer or the like. In the optical measurement device 306, the product is irradiated with the irradiation light L1, the condensing unit 13 receives the returned light L2 of the irradiation light L1, and the signal analyzing unit 14b in the measurement module 17 measures a property of the product.

When a product on the belt conveyer is not constantly mounted at the same position, as described in the optical measurement device 303 according to the third embodiment, the camera 15 may image the product, the image identification unit 16 may check the position of the product, and the beam control unit 12 may correct an outgoing direction of the irradiation light L1.

Example 2

Figure 11:
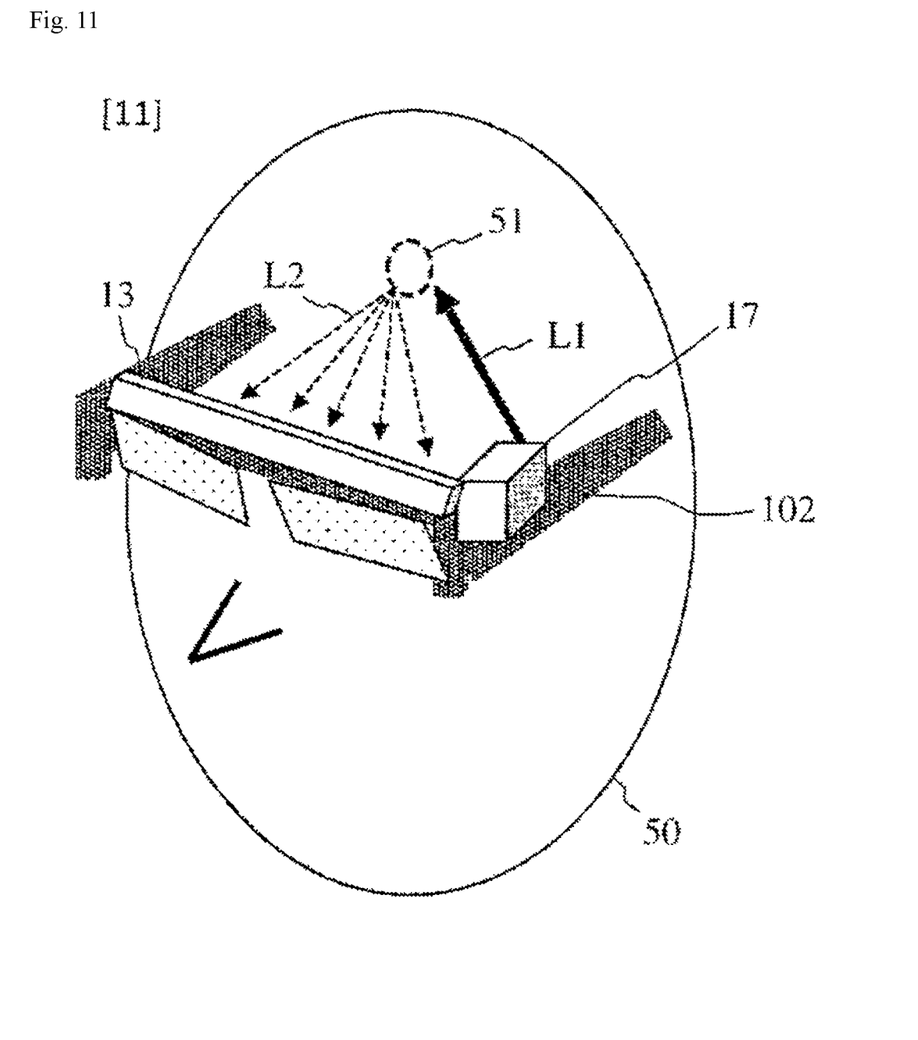
FIG. 11 is a diagram illustrating an example of the optical measurement device according to the present invention.

FIG. 11 is a diagram illustrating an example in which the optical measurement device 306 is applied as a cerebral blood flow measurement module mounted on smart glasses 102. The measurement target 50 is the head of a person. In the optical measurement device 306, blood vessels of the head are irradiated with the irradiation light L1, the condensing unit 13 receives the returned light L2 of the irradiation light L1, and the signal analyzing unit 14b in the measurement module 17 measures a blood flow of the measurement part 51.

When blood flows of a plurality of parts of the head are desired to be measured, as described in the optical measurement device 302 according to the second embodiment, the parts of the head may be scanned with the irradiation light L1.

REFERENCE SIGNS LIST

11 Light source
11a Light source unit
11b Beam forming unit
11c Modulation unit
12 Beam control unit
13 Condensing unit
13a Light receiving element
13b Light receiving element array
13c Light amount integration unit
14 Detection unit
14a Light receiving unit
14b Signal analyzing unit
14c Timing adjustment unit
14d Optical amplifier
14e Light receiving element
14f Local light source
14g Optical multiplexer
14h Light receiving element
14j Filter
15 Camera
16 Image identification unit
17 Measurement module
301 to 306 Optical measurement device

The invention claimed is:

1. An optical measurement device comprising:
a light source configured to generate and emit (i) a first irradiation light with a beam shape at a first time, and (ii) a second irradiation light at a second time;
a beam controller, comprising a micro electro mechanical systems mirror, configured to control a first irradiation direction of the first irradiation light, and a second irradiation direction of the second irradiation light;
condensing unit configured to condense (i) a first returned light generated by irradiating a first part of a measurement target with the first irradiation light, and (ii) a second returned light generated by irradicating a second part of the measurement target with the second irradiation light; and a detector, including one or more processors, configured to:
  detect the first returned light and the second returned light condensed by the condensing unit,
  match (i) the first irradiation light with the first returned light based on a timing of the first irradiation light and a timing of the first returned light, and match (ii) the second irradiation light with the second returned light based on a timing of the second irradiation light and a timing of the second returned light, and
  determine property information regarding (i) the first part of the measurement target based on an amount of the first returned light and (ii) the second part of the measurement target based on an amount of the second returned light.

2. The optical measurement device according to claim 1, wherein the beam controller changes irradiation direction of each irradiation light with time to scan a surface of the measurement target.

3. The optical measurement device according to claim 1, further comprising:
  a camera configured to acquire an image of the measurement target; and
  an image recognition unit, comprising one or more processors, configured to recognize, from the image, an irradiation position where the measurement target is irradiated with each irradiation light.

4. The optical measurement device according to claim 3, wherein the beam controller notifies the image recognition unit of a target position on the measurement target to be irradiated with each irradiation light and corrects, when there is a deviation between the target position and the irradiation position, a direction of the irradiation light to reduce the deviation, and
the image recognition unit detects the deviation from the image and notifies the beam controller of the deviation that is detected.

5. The optical measurement device according to claim 1, wherein the light source includes a modulation unit that modulates each irradiation light at a specific frequency, and
the detector includes a filter that extracts a component of the specific frequency from a received signal obtained by converting each returned light into an electrical signal.

6. The optical measurement device according to claim 1, wherein the condensing unit is a lens that collects each returned light into a light receiving unit.

7. The optical measurement device according to claim 1, wherein the condensing unit includes a light receiving element array with a plurality of light receiving elements being arrayed and an integrator that integrates an electrical signal received by the light receiving element array.

* * * * *